(12) United States Patent
Gautam et al.

(10) Patent No.: US 11,326,888 B2
(45) Date of Patent: May 10, 2022

(54) GENERATION OF POLAR OCCLUSION MAPS FOR AUTONOMOUS VEHICLES

(71) Applicant: UATC, LLC, San Francisco, CA (US)

(72) Inventors: Shivam Gautam, Pittsburgh, PA (US); Brian C. Becker, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 762 days.

(21) Appl. No.: 16/057,167

(22) Filed: Aug. 7, 2018

(65) Prior Publication Data

US 2020/0033140 A1    Jan. 30, 2020

Related U.S. Application Data

(60) Provisional application No. 62/703,167, filed on Jul. 25, 2018.

(51) Int. Cl.
*G06T 7/10* (2017.01)
*G01C 21/32* (2006.01)
(Continued)

(52) U.S. Cl.
CPC .......... *G01C 21/32* (2013.01); *G01C 21/367* (2013.01); *G01S 17/42* (2013.01); *G01S 17/89* (2013.01);
(Continued)

(58) Field of Classification Search
CPC . G06T 2207/30261; G06T 7/536; G06T 7/12; G06K 9/00805; G06K 9/00798; G01S 15/93; G01S 17/93; G01S 17/931
(Continued)

(56) References Cited

U.S. PATENT DOCUMENTS

| 7,626,569 B2* | 12/2009 | Lanier | G06F 1/1601 |
| | | | 345/156 |
| 8,589,014 B2* | 11/2013 | Fairfield | G05D 1/0246 |
| | | | 701/28 |

(Continued)

FOREIGN PATENT DOCUMENTS

CN          103093497          5/2013

OTHER PUBLICATIONS

A book: "Visual Perception for Humanoid Robots"; Environmental Recognition and Localization, from Sensor Signals to Reliable 6D Poses, by David Israel, and Gonzalez Aguirre (Part of the Cognitive Systems Monographs book series (COSMOS, vol. 38) ). (Year: 2019).*

(Continued)

*Primary Examiner* — Cuong H Nguyen
(74) *Attorney, Agent, or Firm* — Dority & Manning, P.A.

(57) ABSTRACT

Systems, methods, tangible non-transitory computer-readable media, and devices for operating an autonomous vehicle are provided. For example, a vehicle computing system can receive sensor data including information based on sensor outputs associated with detection of objects in an environment by sensors of a vehicle. Inflection points can be determined based at least in part on the sensor data. The inflection points can correspond to portions of the objects that occlude detection of the environment beyond the portions of the objects. A set of polar coordinates can be determined for each of the one or more inflection points. The set of polar coordinates can include a distance from the sensors to a portion of the objects and an angle of the sensor with respect to the portion of the objects. Furthermore, sparse map data including the set of polar coordinates can be generated based on the set of polar coordinates.

20 Claims, 8 Drawing Sheets

(51) Int. Cl.
*G01S 17/89* (2020.01)
*G01S 17/42* (2006.01)
*G01C 21/36* (2006.01)
*G06T 7/13* (2017.01)
*G06T 7/181* (2017.01)
*G06T 7/55* (2017.01)

(52) U.S. Cl.
CPC ............... *G06T 7/13* (2017.01); *G06T 7/181* (2017.01); *G06T 7/55* (2017.01)

(58) Field of Classification Search
USPC .............................. 701/1, 450, 468; 345/418
See application file for complete search history.

(56) References Cited

U.S. PATENT DOCUMENTS

| | | | | |
|---|---|---|---|---|
| 9,164,511 | B1* | 10/2015 | Ferguson | G06K 9/00825 |
| 9,216,745 | B2* | 12/2015 | Beardsley | G05D 1/0289 |
| 9,432,929 | B1* | 8/2016 | Ross | H04W 4/026 |
| 10,403,043 | B2* | 9/2019 | Kaufman | G09B 9/30 |
| 10,665,115 | B2* | 5/2020 | Fragoso | B64C 39/024 |
| 2010/0039380 | A1* | 2/2010 | Lanier | G06F 3/012 |
| | | | | 345/156 |
| 2012/0316725 | A1* | 12/2012 | Trepagnier | G08G 1/16 |
| | | | | 701/26 |
| 2014/0139676 | A1* | 5/2014 | Wierich | H04N 7/183 |
| | | | | 348/148 |
| 2014/0330456 | A1* | 11/2014 | Lopez Morales | G05D 1/0022 |
| | | | | 701/3 |
| 2014/0347475 | A1 | 11/2014 | Divakaran et al. | |
| 2015/0045994 | A1* | 2/2015 | Krishna | G08G 5/065 |
| | | | | 701/3 |
| 2015/0272413 | A1* | 10/2015 | Miyake | F24S 40/20 |
| | | | | 701/23 |
| 2015/0334269 | A1* | 11/2015 | Yokota | B60W 30/143 |
| | | | | 382/103 |
| 2016/0221500 | A1* | 8/2016 | Sakai | B60W 30/09 |
| 2017/0053538 | A1* | 2/2017 | Samarasekera | G06K 9/6267 |
| 2017/0185089 | A1* | 6/2017 | Mei | G05D 1/0088 |
| 2017/0371338 | A1* | 12/2017 | Kamata | G01S 17/93 |
| 2019/0005667 | A1* | 1/2019 | Khawaja | G06T 7/536 |
| 2019/0051051 | A1* | 2/2019 | Kaufman | G06F 3/01 |
| 2021/0094577 | A1* | 4/2021 | Shalev-Shwartz | |
| | | | | B60W 30/181 |
| 2021/0162995 | A1* | 6/2021 | Shalev-Shwartz | G01S 13/931 |
| 2021/0191406 | A1* | 6/2021 | Shalev-Shwartz | |
| | | | | B60W 40/107 |
| 2021/0200235 | A1* | 7/2021 | Shalev-Shwartz | G05D 1/0214 |
| 2021/0240197 | A1* | 8/2021 | Shalev-Shwartz | |
| | | | | B60W 40/107 |

OTHER PUBLICATIONS

Autonomous Exploration and Inspection—CORE; https://core.ac.uk/download/pdf/35168171.pdf; a technical report by Dirk Holz (Year: Dec. 2009)—255 pages.*

T. Zou et al., "KAM-Net: Keypoint-Aware and Keypoint-Matching Network for Vehicle Detection from 2D Point Cloud," in IEEE Transactions on Artificial Intelligence, doi: 10.1109/TAI.2021.3112945.T (Year: 2021).*

G. Chen et al., "Pseudo-Image and Sparse Points: Vehicle Detection With 2D LiDAR Revisited by Deep Learning-Based Methods," in IEEE Transactions on Intelligent Transportation Systems, vol. 22, No. 12, pp. 7699-7711, Dec. 2021, doi: 10.1109/TITS.2020.3007631. (Year: 2021).*

Spatio-Temporal Deep Residual Network with Hierarchical Attentions for Video Event Recognition by Yonggang Li et al, ACM Transactions on Multimedia Computing, Communications, and Applications,vol. 16,Issue 2s•Apr. 2020 •Article No. 62,pp. 1-21•https://doi.org/10.1145/3378026 (Year: 2020).*

R. Zhou, G. Wang, D. Zhao, Y. Zou and T. Zhang, "Super-Resolution of Low-Quality Images Based on Compressed Sensing and Sequence Information," 2019 IEEE 90th Vehicular Technology Conference (VTC2019—Fall), 2019, pp. 1-5, doi: 10.1109/VTCFall.2019.8891073. (Year: 2019).*

* cited by examiner

GENERATION OF POLAR OCCLUSION MAPS FOR AUTONOMOUS VEHICLES

RELATED APPLICATION

The present application is based on and claims benefit of U.S. Provisional Patent Application No. 62/703,167 having a filing date of Jul. 25, 2018, which is incorporated by reference herein.

FIELD

The present disclosure relates generally to generating occlusion maps for autonomous vehicles.

BACKGROUND

Vehicles, including autonomous vehicles, can receive sensor data that is used to determine the state of an environment through which the vehicle travels. This sensor data can then be used by the autonomous vehicle to perform various operations related to the state of those objects. As the state of objects in the environment is dynamic, and the set of objects in the environment can change over time, the safe operation of an autonomous vehicle may depend on the detection and tracking of these objects over time. However, existing ways of detecting and tracking objects may lack a sufficient level of speed, precision, and accuracy. Accordingly, there exists a need for a way to more effectively detect and track the location of objects proximate to the autonomous vehicle.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of object detection. The computer-implemented method can include receiving, by a computing system including one or more computing devices, sensor data including information based at least in part on one or more sensor outputs associated with detection of one or more objects in an environment by one or more sensors of a vehicle. The computer-implemented method can also include determining, by the computing system, based at least in part on the sensor data, one or more inflection points corresponding to one or more portions of the one or more objects that occlude detection of the environment beyond the one or more portions of the one or more objects. The computer-implemented method can include determining, by the computing system, for each of the one or more inflection points, a set of polar coordinates including a distance from a sensor of the one or more sensors to a portion of the one or more portions of the one or more objects and an angle of the sensor with respect to the portion of the one or more objects. Furthermore, the computer-implemented method can include generating, by the computing system, based at least in part on the set of polar coordinates, sparse map data including the set of polar coordinates.

Another example aspect of the present disclosure is directed to one or more tangible non-transitory computer-readable media storing computer-readable instructions that when executed by one or more processors cause the one or more processors to perform operations. The operations can include receiving sensor data including information based at least in part on one or more sensor outputs associated with detection of one or more objects in an environment by one or more sensors of a vehicle. The operations can also include determining, based at least in part on the sensor data, one or more inflection points corresponding to one or more portions of the one or more objects that occlude detection of the environment beyond the one or more portions of the one or more objects. The operations can include determining, for each of the one or more inflection points, a set of polar coordinates including a distance from a sensor of the one or more sensors to a portion of the one or more portions of the one or more objects and an angle of the sensor with respect to the portion of the one or more objects. Furthermore, the operations can include generating, based at least in part on the set of polar coordinates, sparse map data including the set of polar coordinates.

Another example aspect of the present disclosure is directed to a computing device including: one or more processors; a memory including one or more computer-readable media, the memory storing computer-readable instructions that when executed by the one or more processors cause the one or more processors to perform. The operations can include receiving sensor data including information based at least in part on one or more sensor outputs associated with detection of one or more objects in an environment by one or more sensors of a vehicle. The operations can also include determining, based at least in part on the sensor data, one or more inflection points corresponding to one or more portions of the one or more objects that occlude detection of the environment beyond the one or more portions of the one or more objects. The operations can include determining, for each of the one or more inflection points, a set of polar coordinates including a distance from a sensor of the one or more sensors to a portion of the one or more portions of the one or more objects and an angle of the sensor with respect to the portion of the one or more objects. Furthermore, the operations can include generating, based at least in part on the set of polar coordinates, sparse map data including the set of polar coordinates.

Other example aspects of the present disclosure are directed to other systems, methods, vehicles, apparatuses, tangible non-transitory computer-readable media, and devices for generating occlusion maps of an environment detected by sensors of an autonomous vehicle. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
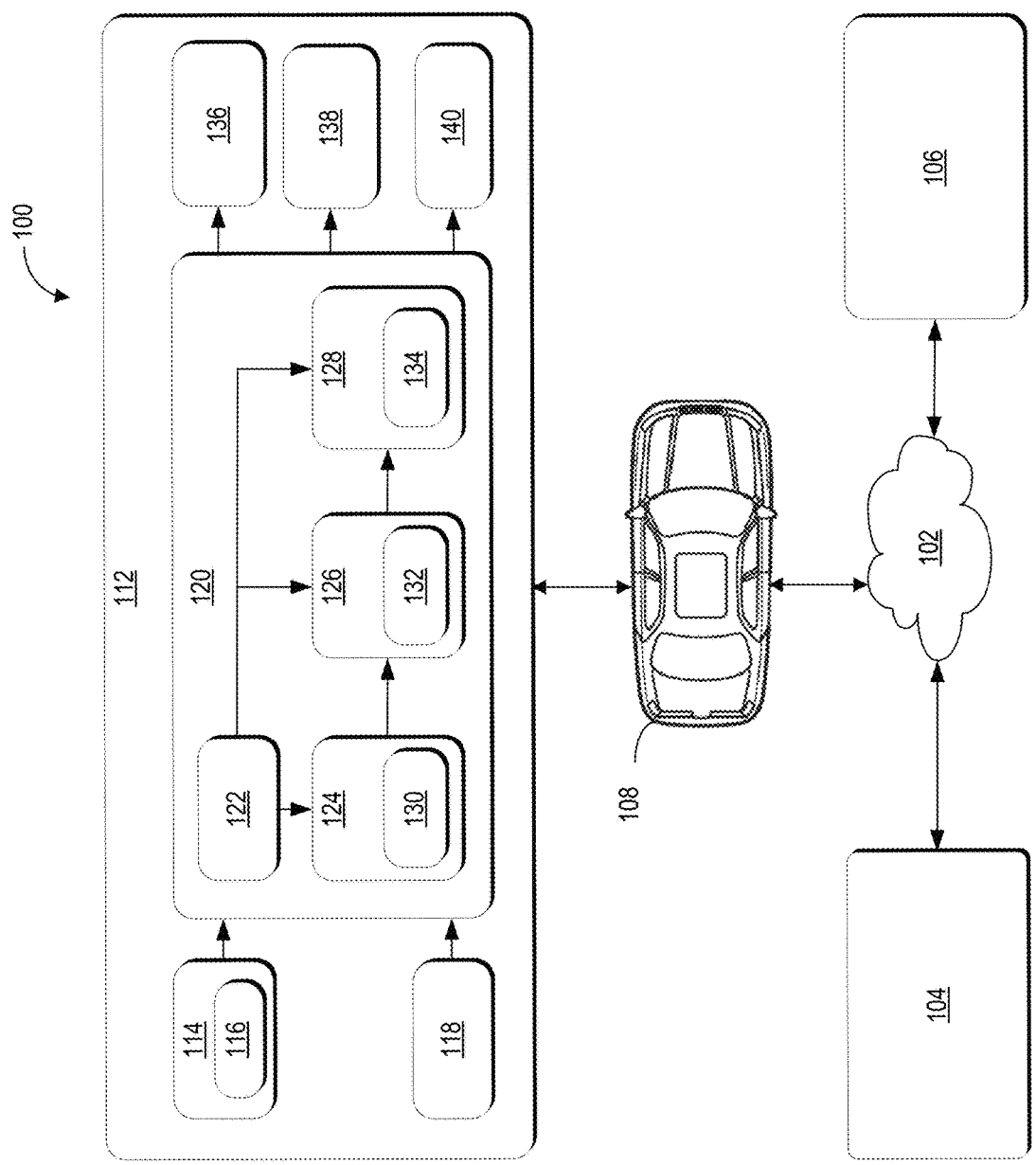
FIG. 1 depicts a diagram of an example system according to example embodiments of the present disclosure.

Example aspects of the present disclosure are directed to the generation of an occlusion map that indicates portions of an environment proximate (e.g., within a predetermined distance and/or within sensor range) to a vehicle (e.g., an autonomous vehicle, a semi-autonomous vehicle, or a manually operated vehicle) that are not detected by one or more sensors (e.g., one or more light detection and ranging (LIDAR) devices, sonar devices, radar devices, and/or image camera devices) of the vehicle. More particularly, aspects of the present disclosure include receiving sensor data including information based on sensor outputs that are associated with detection of objects in an environment by a sensor (e.g., a LIDAR device) of a vehicle; determining, based at least in part on the sensor data, inflection points corresponding to portions of the objects that occlude (e.g., block or conceal) detection of the environment beyond the respective portions of the objects; determining, for each of the inflection points, a set of polar coordinates that includes a distance from the sensor to the respective portion of the objects and an angle of the sensor with respect to the portion of the objects; and generating, based at least in part on the set of polar coordinates, sparse map data that includes the set of polar coordinates.

For example, a computing system associated with an autonomous vehicle can receive data including sensor data associated with the location of one or more portions (e.g., surfaces) of one or more objects in an environment. The sensor data can, for instance, come from a LIDAR device mounted on the roof of the vehicle and be used to determine inflection points corresponding to the points at which a laser beam from the LIDAR device strikes portions of the surface of the one or more objects. The computing system can then determine polar coordinates for each of the portions of the surface of the one or more objects including distances (e.g., a distance in meters) to the portions of the one or more objects and corresponding angles to the portions of the one or more objects with respect to the sensor (e.g., an angle in radians). The polar coordinates can be included in sparse map data generated by the computing system, from which an occlusion map showing areas of the environment that are occluded from detection by the sensor. This occlusion map can then be used by other vehicle systems that assist in operation of the vehicle including perception systems, prediction systems, motion planning systems, and/or other subsystems associated with operation of the vehicle. Accordingly, the disclosed technology allows for the creation of an occlusion map with a smaller footprint (e.g., smaller size resulting in less bandwidth usage) and reduced computational resource usage due to the reduction in extraneous information (e.g., information that does not increase the accuracy of the occlusion map) from the occlusion map.

A vehicle according to the disclosed technology can include one or more systems including a vehicle computing system (e.g., one or more computing devices with one or more processors and a memory storage device that can control a variety of vehicle systems and/or vehicle components). The vehicle computing system can process, generate, send, and/or receive one or more signals and/or data, including signals and/or data exchanged with various vehicle systems, vehicle components, other vehicles, or remote computing systems.

For example, the vehicle computing system can send and/or receive one or more signals (e.g., electronic signals) and/or data with one or more vehicle systems including one or more sensor systems (e.g., systems that generate one or more outputs based on detection of changes in the state of the physical environment external to the vehicle) including LIDAR devices, cameras, microphones, radar devices, thermal sensors, and/or sonar devices; communication systems (e.g., wired and/or wireless communication systems that can exchange signals and/or data with other devices); perception systems including one or more systems used to determine the state of the environment surrounding a vehicle; motion planning systems including one or more systems used to determine a travel path for a vehicle; prediction systems used to predict the future location, future position, future orientation, and/or travel path (e.g., the locations traversed by an object over a plurality of time intervals) of one or more objects in the environment surrounding a vehicle; navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

The vehicle computing system can receive sensor data including information based at least in part on one or more sensor outputs associated with detection of one or more objects in an environment by one or more sensors of a vehicle. The one or more objects detected by the one or more sensors can include one or more vehicles, one or more pedestrians, one or more cyclists, one or more roads, one or more buildings, one or more features of a road, and/or one or more natural geographic formations. Further, the sensor data can be based at least in part on one or more sensor outputs associated with one or more physical features, properties, and/or attributes of the one or more objects. The one or more sensor outputs can be associated with the shape, location, position, orientation (e.g., compass bearing), velocity, acceleration, and/or physical dimensions (e.g., width, depth, and/or height) of the one or more objects and/or one or more portions of the one or more objects (e.g., a top portion of an object of the one or more objects in front of the vehicle).

In some embodiments, the one or more sensor outputs can be based at least in part on a three-hundred and sixty degree light detection and ranging (LIDAR) sweep by one or more LIDAR devices. For example, the vehicle computing system can receive one or more sensor outputs from a LIDAR device mounted on the roof of the vehicle and configured to rotate three-hundred and sixty degrees in order to capture LIDAR data associated with the environment surrounding the vehicle.

In some embodiments, the one or more sensors can include one or more light detection and ranging devices (LIDAR), one or more sonar devices, one or more radar devices, and/or one or more cameras (e.g., visual spectrum cameras and/or infrared cameras). For example, the vehicle computing system can receive one or more sensor outputs from a combination of sensors including one or more LIDAR devices and cameras.

In some embodiments, the one or more sensors can be positioned on the vehicle to provide a bird's eye view of the one or more objects. The bird's eye view position of the one or more sensors can facilitate the capture of information associated with one or more objects in the environment surrounding a vehicle.

The vehicle computing system can determine, based at least in part on the sensor data, one or more inflection points corresponding to one or more portions of the one or more objects that occlude detection of the environment beyond the one or more portions of the one or more objects. For example, the vehicle computing system can determine, based on the sensor data from a LIDAR device, one or more inflection points where a pulsed laser light from the LIDAR device is reflected by the surface of an object in the environment.

The vehicle computing system can determine, for each of the one or more inflection points, a set of polar coordinates including a distance (e.g., a distance in meters) from a sensor of the one or more sensors to a portion of the one or more portions of the one or more objects and an angle (e.g., an angle in degrees or radians relative to a plane parallel to the ground beneath the vehicle) of the sensor with respect to the portion of the one or more objects. For example, the vehicle computing system can determine the one or more inflection points based on distance and angle information from a LIDAR device of the vehicle.

In some embodiments, the set of polar coordinates can include a plurality of discretized angles ranging from zero degrees to three-hundred and fifty-nine degrees.

The vehicle computing system can generate, based at least in part on the set of polar coordinates, sparse map data including the set of polar coordinates. For example, the vehicle computing system can generate the sparse map data to include the set of polar coordinates, a geographic location (e.g., latitude and longitude of the vehicle), and a time stamp to indicate the time at which the sparse map data was captured.

In some embodiments, generating, based at least in part on the set of polar coordinates, sparse map data including the set of polar coordinates can include determining a format for the sparse map data based at least in part on an amount of bandwidth available to transmit the sparse map data. The format for the sparse map data can be associated with a type of encoding used to construct and/or reconstruct an occlusion map based at least in part on the sparse map data. For example, in a situation in which bandwidth is plentiful, the vehicle computing system can use a format for the sparse data that is less computationally intensive at the expense of slightly greater bandwidth usage. By way of further example, in a situation in which bandwidth is limited, the vehicle computing system can use a format for the sparse data that is more computationally intensive but that allows for relatively less bandwidth usage.

In some embodiments, the sparse map data can be compressed using lossless compression. For example, the sparse map data can be compressed using a type of compression in which the information in the sparse map data can be reconstructed without any loss of information (e.g., the set of polar coordinates are completely and accurately reconstructed).

The vehicle computing system can generate, based at least in part on the sparse map data, an occlusion map including the one or more portions of the environment that are occluded from the one or more sensors. For example, the vehicle computing system can generate an occlusion map that includes data associated with the location of the area corresponding to the occlusion map and a grid indicating the portions of the map that were detected by one or more sensors of the vehicle and the portions of the map that were occluded from detection by the one or more sensors of the vehicle.

Furthermore, in some embodiments, the sparse map data can include information associated with using the set of polar coordinates to generate the occlusion map of the one or more portions of the environment that are occluded from detection by the one or more sensors. For example, the polar coordinates included in the sparse map data can include information that is used to generate an occlusion map represented as a set of areas on a Cartesian plane.

In some embodiments, the occlusion map can include a two-dimensional representation of one or more portions of the environment proximate to the vehicle that are not detected by the one or more sensors. For example, the occlusion map can include a two dimensional grid of the area around the vehicle, in which occluded areas are demarcated.

The vehicle computing system can send the occlusion map to a perception system of the vehicle and/or a motion planning system of the vehicle. The vehicle computing system can send (e.g., transmit via a wired and/or wireless connection) one or more signals or data including the occlusion map to a perception system, a prediction system, a motion planning system, and/or other subsystem of the vehicle. In this way, the occlusion map can be used to assist in perception (e.g., determining the state of the environment around the vehicle) and/or motion planning (e.g., determining a travel path for the vehicle) for the vehicle.

In some embodiments, determining, for each of the one or more inflection points, a set of polar coordinates including a distance from a sensor of the one or more sensors to a portion of the one or more portions of the one or more objects and an angle of the sensor with respect to the portion of the one or more portions of the one or more objects can include determining, a height of each of the one or more inflection points. Further, determining the set of polar coordinates can include determining that the set of polar coordinates is based at least in part on a first set of the one or more inflection points that is closer to the sensor and has a higher height than a second set of the one or more inflection points that has an angle that is at least equal to the first set of the one or more inflection points. For example, the vehicle computing system can, based on the sensor data, determine the height of the one or more inflection points. Further, the vehicle computing system can determine that the one or more inflection points that are In some embodiments, the vehicle computing system determining, based at least in part on the sensor data, one or more inflection points corresponding to one or more portions of the one or more objects that occlude detection of the environment beyond the one or more portions of the one or more objects can include determining a number of the one or more inflections points based at least in part on sparseness data including a number of the one or more inflection points per unit of area. For example, the sparseness data can be associated with one inflection points per cubic decimeter (a cube that is ten centimeters per side) that will be more granular than sparseness data associated with one inflection point per cubic meter (a cube that is one meter per side). As such, increasing the number of the one or more inflection points per unit of area can result in a more accurate occlusion map.

In some embodiments, the vehicle computing system determining, based at least in part on the sensor data, one or more inflection points corresponding to one or more portions of the one or more objects that occlude detection of the environment beyond the one or more portions of the one or more objects can include determining, the location of the one or more sensors with respect to the one or more objects over a plurality of time intervals. Further, the vehicle computing system can determine the one or more inflection points based at least in part on changes in the location of the one or more sensors over the plurality of time intervals. For example, the vehicle computing system can determine the location of the one or more sensors based on navigational data from a navigational device (e.g., a GPS device) or based on a relative position of the vehicle with respect to objects in its environment through use of one or more sensors including sonar and/or cameras. As such, the vehicle computing system can determine the one or more inflection points as the vehicle and/or the objects surrounding the vehicle are in motion.

In some embodiments, the one or more inflection points can include one or more three-dimensional points corresponding to a plurality of surfaces of the one or more objects detected by the one or more sensors. For example, the one or more inflection points can correspond to the point where a LIDAR laser strikes the surface of a bus located next to the vehicle.

In some embodiments, the vehicle computing system determining, based at least in part on the sensor data, one or more inflection points corresponding to one or more portions of the one or more objects that occlude detection of the environment beyond the one or more portions of the one or more objects can include determining, a plurality of areas of the environment in which each of the plurality of areas is a predetermined size. Further, the vehicle computing system can determine that each area of the plurality of areas includes one (e.g., only one) of the one or more inflection points. For example, the vehicle computing system can generate a representation of the environment surrounding the vehicle in which the environment is divided into a plurality of equally sized cubic areas (e.g., cubic areas that are twenty-five centimeters per side).

Further, in some embodiments, the vehicle computing system can determine that the one or more portions below a highest portion in each of the plurality of areas is occluded. For example, the vehicle computing system can determine that in a one meter square portion of the ground with a tree branch at a height of one and a half meters and a pylon at height of half a meter, that the area below the tree branch is occluded.

In some embodiments, the vehicle computing system determining, based at least in part on the sensor data, one or more inflection points corresponding to one or more portions of the one or more objects that occlude detection of the environment beyond the one or more portions of the one or more objects can include determining that the one or more inflection points correspond to the one or more portions of the one or more objects that are less than a predetermined height threshold. For example, the vehicle computing system can determine that the one or more inflection points correspond to the one or more portions of the one or more objects below the height of the sensor (e.g., below one and a half meters for a sensor mounted on the roof of an automobile).

In some embodiments, the predetermined height threshold can be based at least in part on a lowest point of the environment with respect to the vehicle or a height of a sensor of the one or more sensors. For example, the predetermined height threshold can be based on the distance from the ground proximate to the vehicle to a sensor mounted on the vehicle.

The systems, methods, devices, and non-transitory computer-readable media in the disclosed technology can provide a variety of technical effects and benefits to the overall operation of the vehicle and the generation of occlusion maps in particular. The disclosed technology can more effectively generate accurate occlusion maps that can be transmitted with low bandwidth usage and reduced utilization of computational resources. Additionally, the disclosed technology can leverage the benefits of using different approaches to generating the occlusion map based on prioritization of minimizing bandwidth usage or utilization of computational resources.

For example, the disclosed technology can generate sparse map data that can, at a later time, be reconstructed for use as an occlusion map of areas in an environment that are occluded from detection by sensors of the vehicle. The sparse map data can include a plurality of polar coordinates that represent the subset of the environment that occludes the vehicle's sensors and that can be included in a smaller dataset than a less compact representation of occlusions in the environment that includes extraneous information such as redundant occluded areas (e.g., occluded areas that fall completely within another larger occluded area). As such, the sparse map data allows for reductions in bandwidth usage when transmitting an occlusion map. Additionally, the disclosed technology can determine a type of amount of compression to apply to the sparse map data based on the availability of bandwidth or computational resources.

Furthermore, the disclosed technology can reduce the amount of computational resources needed to generate occlusion maps by reducing the number of data points that are needed to create the occlusion map. For example, instead of using raw data from a sensor (e.g., raw LIDAR point cloud data), the disclosed technology can use the raw data to generate sparse map data that includes a set of polar coordinates from which an accurate occlusion map can be generated. By using a selected sampling of data points from the sensor data, the disclosed technology can reduce the amount of computational resources utilized when the occlusion map is constructed. Further, the occlusion map can be reconstructed more rapidly due to the smaller size of the sparse map data that is generated.

Accordingly, the disclosed technology provides improved generation of occlusion maps. Operational benefits of the disclosed technology include enhanced vehicle safety resulting from more efficient transmission of reduced size occlusion maps, improved bandwidth utilization due to more compact occlusion maps, and better use of computational resources due to sparse map data with a smaller number of inflection points (e.g., a smaller number of inflection points in comparison to raw LIDAR data) that can be more rapidly processed and from which occlusion maps can be generated.

With reference now to FIGS. 1-10, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and/or functions associated with operation of a vehicle including receiving sensor data including information based at least in part on one or more sensor outputs associated with detection of one or more objects in an environment by one or more sensors of a vehicle (e.g., the one or more sensors 114 of the vehicle 108); determining, based at least in part on the sensor data, one or more inflection points corresponding to one or more portions of the one or more objects that occlude detection of the environment beyond the one or more portions of the one or more objects; determining, for each of the one or more inflection points, a set of polar coordinates including a distance from a sensor of the one or more sensors to a portion of the one or more portions of the one or more objects and an angle of the sensor with respect to the portion of the one or more objects; and generating, based at least in part on the set of polar coordinates, sparse map data (e.g., sparse map data that can be used to generate an occlusion map) including the set of polar coordinates.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108; and/or passenger status data associated with the status of passengers of the vehicle. The vehicle status data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle). The passenger status data can include one or more states of passengers of the vehicle including one or more locations of one or more passengers.

The operations computing system 104 can communicate with the one or more remote computing devices 106 and/or the vehicle 108 via one or more communications networks including the communications network 102. The communications network 102 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile), an aircraft, and/or another type of vehicle. The vehicle 108 can be an autonomous vehicle that can perform various actions including driving, navigating, and/or operating, with minimal and/or no interaction from a human driver. The autonomous vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions and/or appearance of the one or more objects) can be stored locally in one or more memory devices of the vehicle 108. Furthermore, the vehicle 108 can provide data indicative of the state of the one or more objects (e.g., physical dimensions and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for receiving sensor data including information based at least in part on one or more sensor outputs associated with detection of one or more objects in an environment by one or more sensors of a vehicle (e.g., the one or more sensors 114 of the vehicle 108). Further, the operations can include determining, based at least in part on the sensor data, one or more inflection points. The one or more inflection points can correspond to one or more portions of the one or more objects that occlude detection of the environment beyond the one or more portions of the one or more objects. Further, the operations can include determining, for each of the one or more inflection points, a set of polar coordinates including a distance from a sensor of the one or more sensors to a portion of the one or more portions of the one or more objects and an angle of the sensor with respect to the portion of the one or more objects. The operations can also include generating, based at least in part on the set of polar coordinates, sparse map data including the set of polar coordinates.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LIDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LIDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that can use an occlusion map that indicates the portions of the environment that are occluded from detection by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

Figure 5:
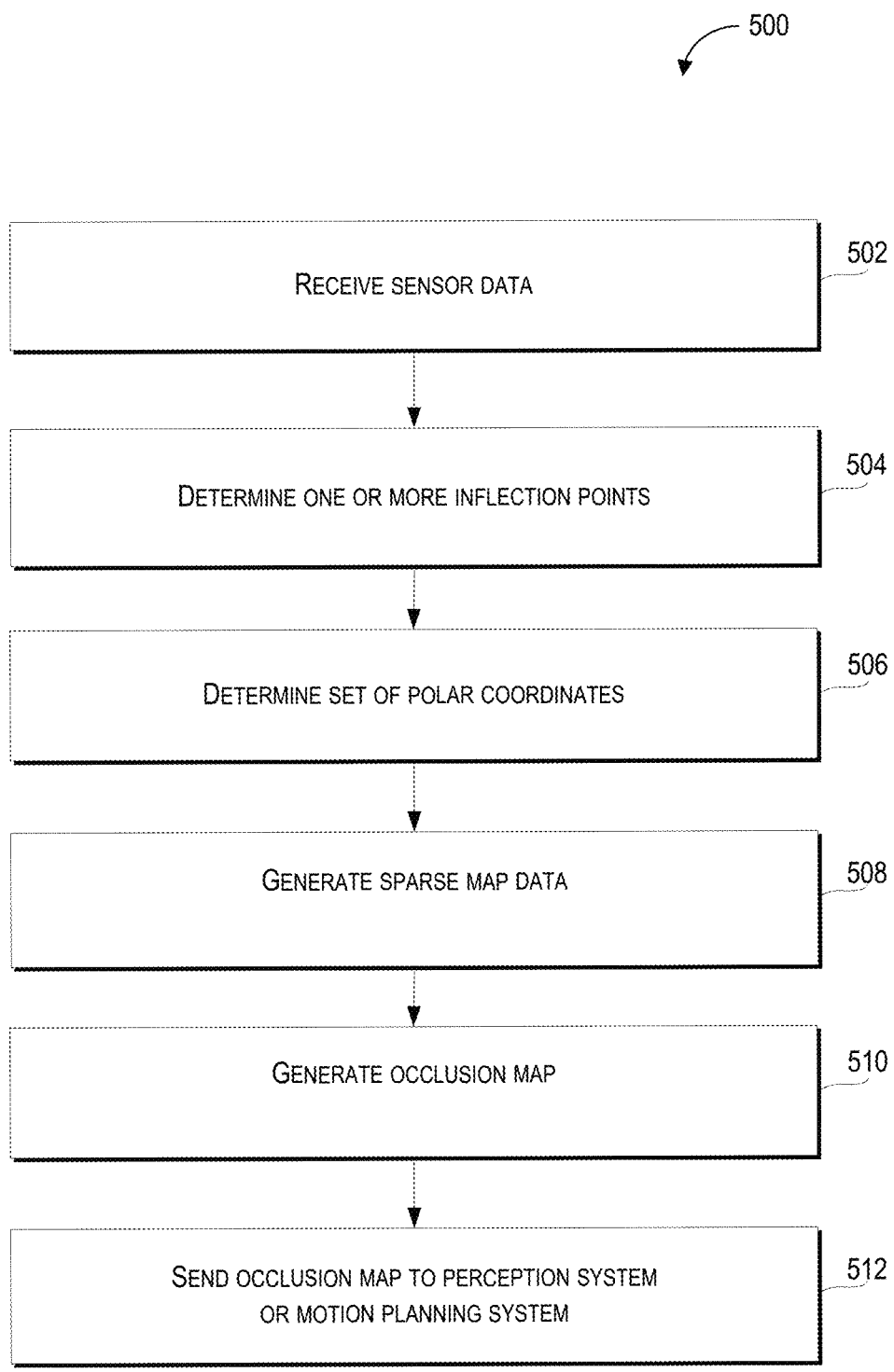
FIG. 5 depicts a flow diagram of an example method of polar occlusion mapping according to example embodiments of the present disclosure.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to send sparse map data (e.g., the sparse map data described in the method 500 that is depicted in FIG. 5), and/or change the path of the vehicle 108 (e.g., sending one or more signals to an engine system and steering system of the vehicle).

By way of further example, the vehicle computing system 112 can activate one or more vehicle systems including the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle; and/or steering systems that can change the path, course, and/or direction of travel of the vehicle 108.

In some embodiments, the vehicle computing system 112 can perform one or more operations including receiving sensor data including information based at least in part on one or more sensor outputs associated with detection of one or more objects in an environment by one or more sensors of a vehicle, in which the one or more sensor outputs are based at least in part on a three-hundred and sixty degree light detection and ranging (LIDAR) sweep by one or more LIDAR devices.

In some embodiments, the vehicle computing system 112 can perform one or more operations including determining, for each of the one or more inflection points, a set of polar coordinates including a distance from a sensor of the one or more sensors to a portion of the one or more portions of the one or more objects and an angle of the sensor with respect to the portion of the one or more objects. Further, the set of polar coordinates can include a plurality of discretized angles ranging from zero degrees to three-hundred and fifty-nine degrees.

In some embodiments, the vehicle computing system 112 can perform one or more operations including determining a format for the sparse map data based at least in part on an amount of available bandwidth. Further, the format for the sparse map data can be associated (e.g., associated by the vehicle computing system 112) with a type of encoding used to construct or reconstruct an occlusion map based at least in part on the sparse map data.

In some embodiments, the vehicle computing system 112 can perform one or more operations including generating, based at least in part on the set of polar coordinates, sparse map data comprising the set of polar coordinates. Further, the sparse map data can be compressed (e.g., compressed by the vehicle computing system 112) using lossless compression.

Figure 2:
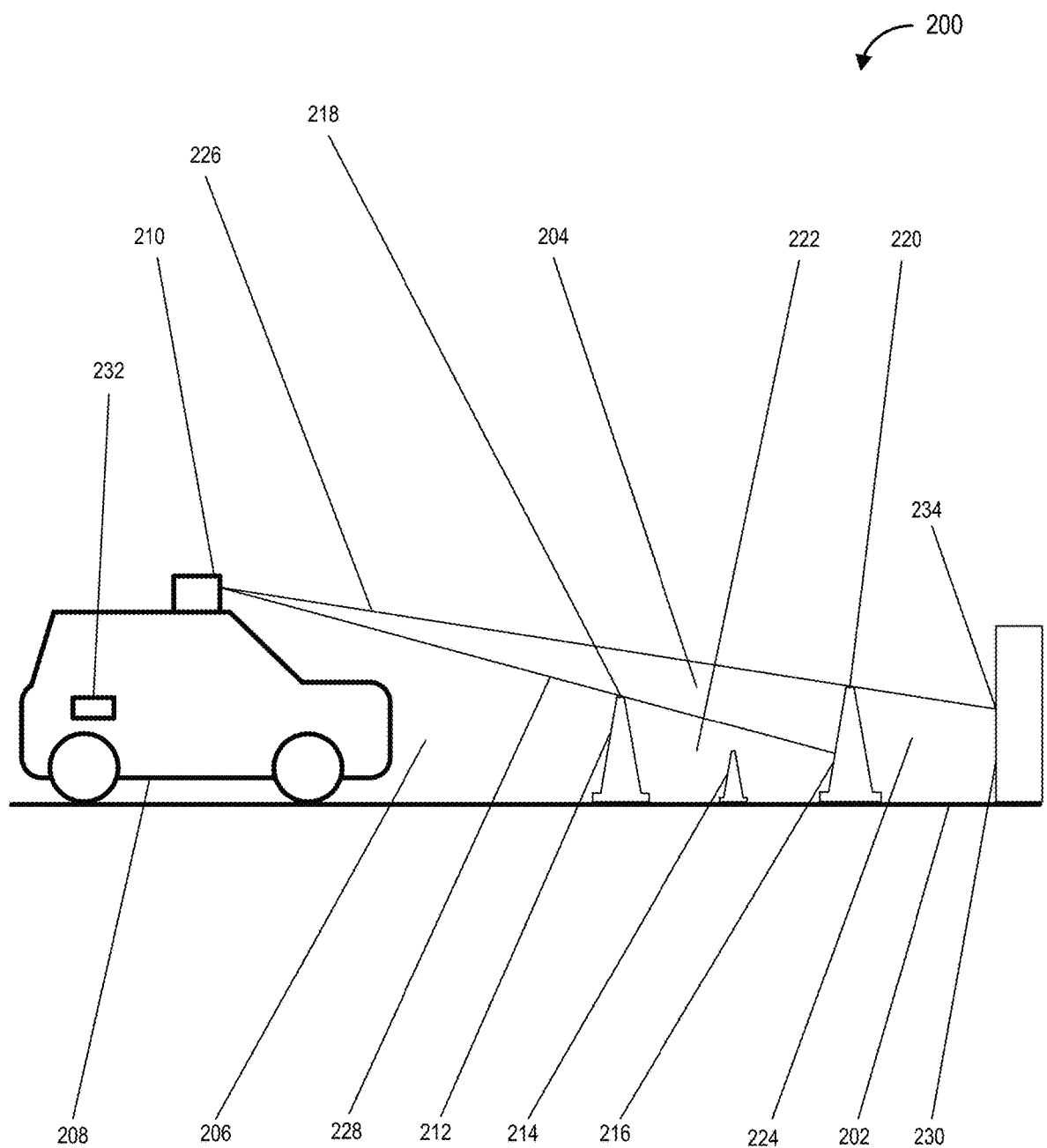
FIG. 2 depicts an example aspect of object detection according to example embodiments of the present disclosure.

FIG. 2 depicts an example aspect of object detection according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 2 shows an environment 200 that includes a ground portion 202 (e.g., a road surface), a non-occluded area 204 (e.g., an area detected by one or more sensors 210 of a vehicle 208), a non-occluded area 206 (e.g., an area detected by one or more sensors 210 of a vehicle 208), the vehicle 208 (e.g., a vehicle including one or more features of the vehicle 108 that is depicted in FIG. 1), the one or more sensors 210 (e.g., one or more sensors including one or more features of the one or more sensors 114 that are depicted in FIG. 1), an object 212 (e.g., a first, medium sized pylon), an object 214 (e.g., a second, small sized pylon), an object 216 (e.g., a third, large sized pylon), an inflection point 218 (e.g., an inflection point at which the sensor beam 228 contacts a portion of the object 212), an inflection point 220 (e.g., an inflection point at which the sensor beam 226 contacts a portion of the object 216), an occluded area 222 (e.g., an area that is not detected by the one or more sensors 210 of the vehicle 208), an occluded area 224 (e.g., an area that is not detected by the one or more sensors 210 of the vehicle 208), a sensor beam 226 (e.g., a beam or pulse from the one or more sensors 210 which can include a LIDAR device), a sensor beam 228 (e.g., a beam or pulse from the one or more sensors 210 which can include a LIDAR device), an object 230 (e.g., a concrete barrier), and a vehicle computing system 232.

In this example, the vehicle 208 is located on the ground portion 202 (e.g., a road surface) of the environment 200. The vehicle 208 includes the one or more sensors 210 which are mounted on the top portion (e.g., roof) of the vehicle 208. For example, the one or more sensors 210 can include a LIDAR device that generates the sensor beam 226 (e.g., a beam or pulse from the one or more sensors 210) and the sensor beam 228 (e.g., a beam or pulse from the one or more sensors 210). As shown, the sensor beam 226 contacts the object 216 and the object 230 at the inflection point 220 and the inflection point 234 respectively.

The vehicle computing system 232 (e.g., a computing system with one or more features of the vehicle computing system 112 that is depicted in FIG. 1) of the vehicle 208 can determine a set of polar coordinates based at least in part on the location of the one or more sensors 210 and the location of the inflection point 220 which is the point at which the sensor beam 226 contacts the object 216. The set of polar coordinates determined by the vehicle computing system 232 can include: an angle of the one or more sensors 210 with respect to the inflection point 220; and a distance between the one or more sensors 210 and the inflection point 220. Further, the vehicle computing system 232 can determine that the area 224 that is between the object 216 and the object 230, above the ground portion 202, and below the sensor beam 226 is occluded from detection by the one or more sensors 210. Furthermore, the vehicle computing system 232 can determine a set of polar coordinates based at least in part on the inflection point 234 at the object 230.

By way of further example, the vehicle computing system 232 can determine another set of polar coordinates based at least in part on the location of the one or more sensors 210 and the location of the inflection point 218 which is the point at which the sensor beam 228 contacts the object 212. The set of polar coordinates determined by the vehicle computing system 232 can include: an angle of the one or more sensors 210 with respect to the inflection point 218; and a distance between the one or more sensors 210 and the inflection point 218. Further, the vehicle computing system 232 can determine that the area 222 that is between the object 212 and the object 216, above the ground portion 202, below the sensor beam 228, and includes the object 214 is occluded from detection by the one or more sensors 210.

Furthermore, the vehicle computing system 232 can determine, based at least in part on the absence of inflection points, that the area 206, below the sensor beam 228, and the area 204 between the sensor beam 226 and the sensor beam 228, are non-occluded (e.g., detected by the one or more sensors 210).

In some embodiments, the vehicle computing system 232 and can perform one or more operations including receiving sensor data including information based on sensor outputs that are associated with detection of objects in an environment by a sensor (e.g., the one or more sensors 210 including a LIDAR device) of a vehicle. The one or more operations can further include determining, based at least in part on the sensor data, inflection points (e.g., the inflection point 218 and the inflection point 220) corresponding to portions of the objects (e.g., the object 212 and the object 216) that occlude (e.g., block or conceal) detection of the environment (e.g., the environment 200) beyond the respective portions of the objects. The one or more operations can also include determining, for each of the inflection points, a set of polar coordinates that includes a distance from the sensor to the respective portion of the objects and an angle of the sensor with respect to the portion of the objects. Furthermore, the one or more operations can include generating, based at least in part on the set of polar coordinates, sparse map data that includes the set of polar coordinates.

Figure 3:
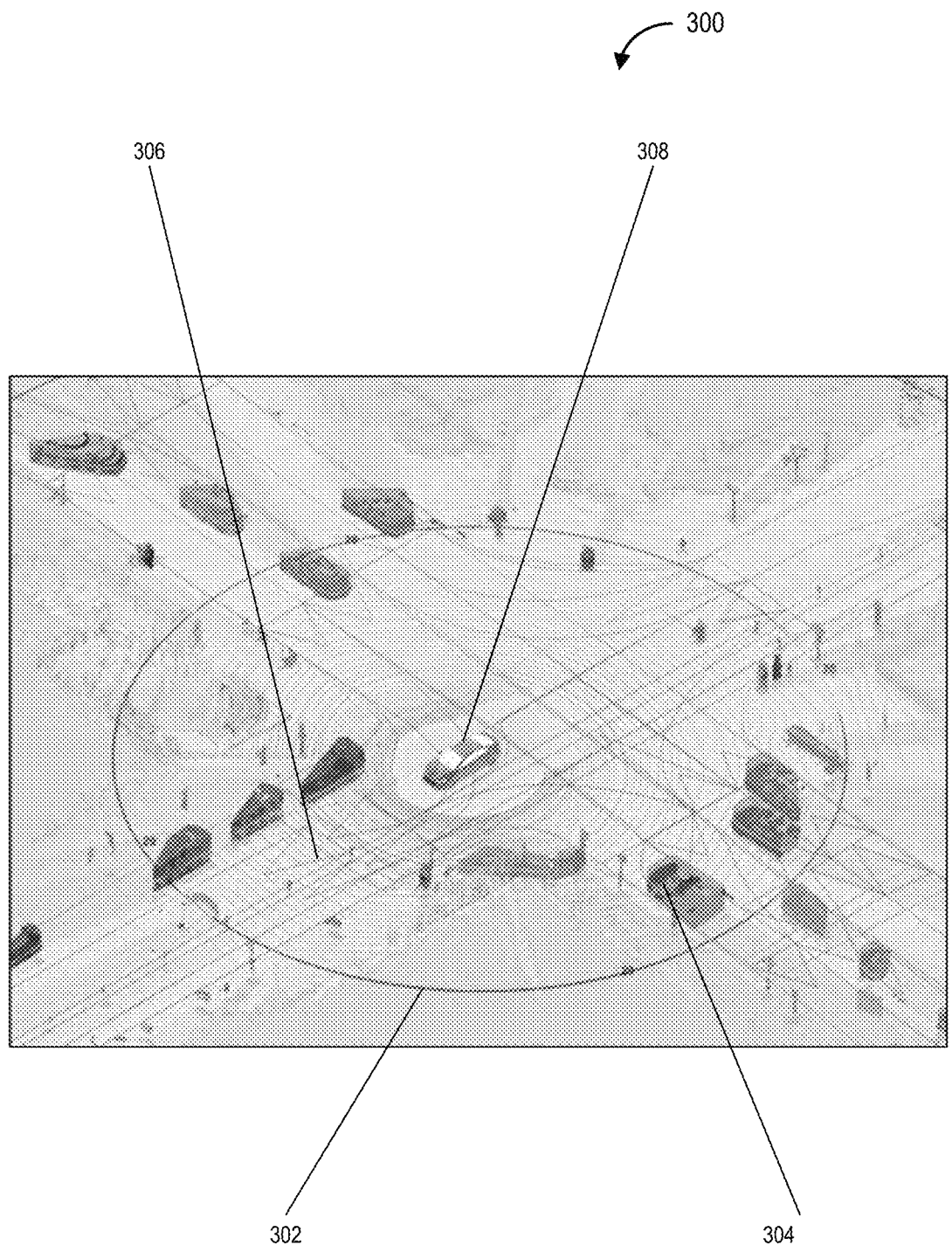
FIG. 3 depicts an example aspect of an occlusion map according to example embodiments of the present disclosure.

FIG. 3 depicts an example of an occlusion map generated by a computing system according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. As illustrated, FIG. 3 shows an occlusion map 300, an occlusion map area 302, an occluded area 304, a non-occluded area 306, and a vehicle 308.

In this example, the occlusion map 300 (e.g., a map of an area including representations of one or more objects in an environment detected by the one or more sensors 114 of the vehicle 108) includes the occlusion map area 302 (e.g., an area in which the accuracy of the one or more sensors 114 of the vehicle 108 is within a predetermined accuracy range and which can include a maximum sensor range of the one or more sensors 114), the occluded area 304 (e.g., an area that is not detected by the one or more sensors 114 of the vehicle 108), the non-occluded area 306 (e.g., an area that is detected by the one or more sensors 114 of the vehicle 108), and the vehicle 308 (e.g., a representation of the vehicle 108). In some embodiments, the occlusion map 300 can be one of a plurality of occlusion maps that represent a detected area over a plurality of time intervals. Accordingly, as a vehicle (e.g., the vehicle 108) travels through an environment and the location of the vehicle's sensors (e.g., the one or more sensors 114) with respect to the environment change, the portions of the occlusion map that are indicated as being occluded and non-occluded can change.

In some embodiments, the occlusion map 300 can be generated by a vehicle computing system (e.g., the vehicle computing system 112 that is depicted in FIG. 1) that can perform one or more operations including receiving sensor data including information based on sensor outputs that are associated with detection of objects in an environment by a sensor (e.g., a LIDAR device) of a vehicle. The one or more operations can also include determining, based at least in part on the sensor data, inflection points corresponding to portions of the objects that occlude (e.g., block or conceal) detection of the environment beyond the respective portions of the objects. Further, the one or more operations can include determining, for each of the inflection points, a set of polar coordinates that includes a distance from the sensor to the respective portion of the objects and an angle of the sensor with respect to the portion of the objects. The one or more operations can also include generating, based at least in part on the set of polar coordinates, sparse map data that includes the set of polar coordinates.

Figure 4:
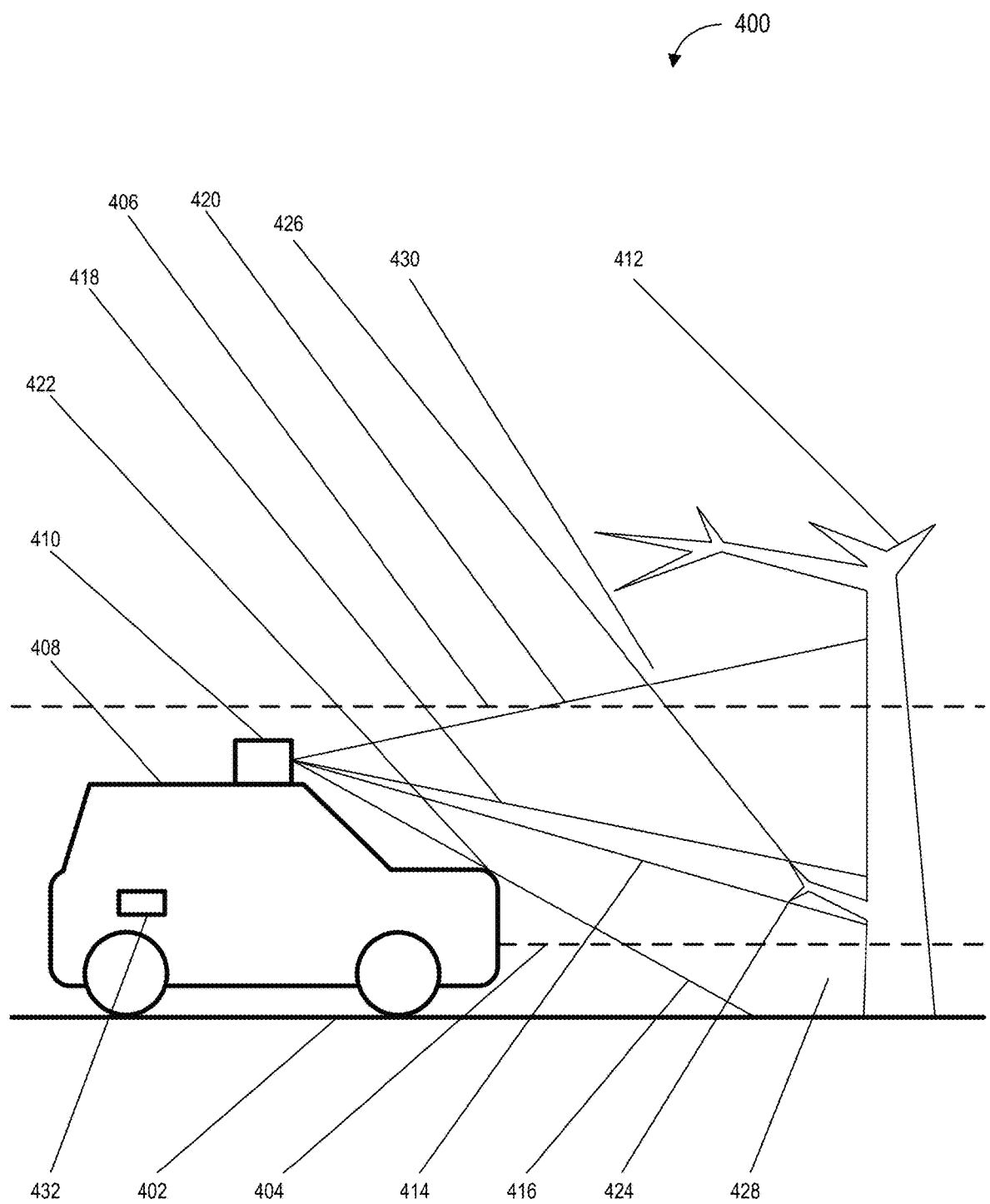
FIG. 4 depicts an example aspect of object detection according to example embodiments of the present disclosure.

FIG. 4 depicts an example of object detection according to example embodiments of the present disclosure. One or more operations and/or functions in FIG. 4 can be implemented and/or performed by one or more devices (e.g., one or more computing devices) or systems including, for example, the operations computing system 104, the vehicle 108, or the vehicle computing system 112, which are shown in FIG. 1.

As illustrated, FIG. 4 shows an environment 400 that includes a ground portion 402 (e.g., a road surface), a height threshold 404 (e.g., a minimum height threshold which can include a threshold height below which the area is determined to be occluded), a height threshold 406 (e.g., a maximum height threshold which can include a threshold height above which the area is determined to be occluded), a vehicle 408 (e.g., a vehicle including one or more features of the vehicle 108 that is depicted in FIG. 1), one or more sensors 410 (e.g., one or more sensors including one or more features of the one or more sensors 114 that are depicted in FIG. 1), an object 412 (e.g., a tree), a sensor beam 414 (e.g., a beam or pulse from a LIDAR device), a sensor beam 416 (e.g., a beam or pulse from the one or more sensors 410 which can include a LIDAR device), a sensor beam 418 (e.g., a beam or pulse from a LIDAR device), a sensor beam 420 (e.g., a beam or pulse from the one or more sensors 410 which can include a LIDAR device), an inflection point 422 (e.g., an inflection point at which the sensor beam 414 contacts a portion of the vehicle 408), an inflection point 424 (e.g., an inflection point at which the sensor beam 414 contacts a portion of the object 412), an inflection point 426 (e.g., an inflection point at which the sensor beam 418 contacts a portion of the object 412), an occluded area 428 (e.g., an area that is not detected by the one or more sensors 410 of the vehicle 408), an occluded area 430 (e.g., an area that is not detected by the one or more sensors 410 of the vehicle 408), and a vehicle computing system 432 (e.g., a computing system with one or more features of the vehicle computing system 112 that is depicted in FIG. 1).

In this example, the vehicle 408 is located on the ground portion 402 (e.g., a road surface) of the environment 400. The vehicle 408 includes the one or more sensors 410 which are mounted on the top portion (e.g., roof) of the vehicle 408. For example, the one or more sensors 410 can include a LIDAR device that generates the sensor beam 414 (e.g., a beam or pulse from the one or more sensors 410), the sensor beam 416 (e.g., a beam or pulse from the one or more sensors 410), the sensor beam 418 (e.g., a beam or pulse from the one or more sensors 410), and the sensor beam 420 (e.g., a beam or pulse from the one or more sensors 410).

As shown, a portion of the sensor beam 420 is above the height threshold 406 and can be determined by the vehicle computing system 432, to be occluded. Further, the vehicle computing system 432 can determine that the portion of the sensor beam 416 that is below the height threshold 404 is also occluded. Accordingly, an occlusion map generated by the vehicle computing system 432 can include the occluded area 430 that is above the height threshold 406 and the occluded area 428 that is below the height threshold 404.

The vehicle computing system 432 of the vehicle 408 can determine a set of polar coordinates based at least in part on the location of the one or more sensors 410 and the location of the inflection point 422 which is the point at which the sensor beam 416 contacts the front portion of the vehicle 408. The set of polar coordinates determined by the vehicle computing system 432 can include: an angle of the one or more sensors 410 with respect to the inflection point 422; and a distance between the one or more sensors 410 and the inflection point 422. Further, the vehicle computing system 432 can determine that the area lower than the inflection point 422 and below the sensor beam 416 is occluded. As such, an occlusion map generated by the vehicle computing system 432 can include the area lower than the inflection point 422 and below the sensor beam 416.

By way of further example, the vehicle computing system 432 can determine another set of polar coordinates based at least in part on the location of the one or more sensors 410 and the location of the inflection point 426 which is the point at which the sensor beam 418 contacts a portion of the object 412 (e.g., a tree branch that is close to the ground portion 402). The set of polar coordinates determined by the vehicle computing system 432 can include: an angle of the one or more sensors 410 with respect to the inflection point 426; and a distance between the one or more sensors 410 and the inflection point 426. Further, the vehicle computing system 432 can determine, based on an intermediate height threshold between the height threshold 404 and the height threshold 406, whether the area below the inflection point 426 is occluded. The vehicle computing system 432 can also determine a set of polar coordinates for the inflection point 424 (e.g., the point at which the sensor beam 414 contacts the portion of the object 412).

In some embodiments, the vehicle computing system 432 can perform one or more operations including receiving sensor data including information based on sensor outputs that are associated with detection of objects in an environment by a sensor (e.g., the one or more sensors 410 including a LIDAR device) of a vehicle (e.g., the vehicle 408). The one or more operations performed by the vehicle computing system 432 can also include determining, based at least in part on the sensor data, inflection points (e.g., the inflection point 424 and the inflection point 426) corresponding to portions of the objects (e.g., the object 412) that occlude (e.g., block or conceal) detection of the environment (e.g., the environment 400) beyond the respective portions of the objects. Further, the one or more operations performed by the vehicle computing system 432 can include determining, for each of the inflection points, a set of polar coordinates that includes a distance from the sensor to the respective portion of the objects and an angle of the sensor with respect to the portion of the objects. The one or more operations performed by the vehicle computing system 432 can also include generating, based at least in part on the set of polar coordinates, sparse map data that includes the set of polar coordinates.

FIG. 5 depicts a flow diagram of an example method of polar occlusion mapping according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1) to, for example, generate an occlusion map based on sensor data received from one or more sensors of a vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include receiving sensor data including information based at least in part on one or more sensor outputs associated with detection of one or more objects in an environment by one or more sensors of a vehicle. For example, the vehicle computing system 112 can receive the sensor data 116 which can include one or more sensor outputs from the one or more sensors 114 of the vehicle 108.

In some embodiments, map data (e.g., the map data 122) can be received by the vehicle (e.g., the vehicle 108). The map data can include information associated with the environment proximate to the vehicle (e.g., a fifty meter radius around the vehicle 108). Further, the map data can include a latitude, longitude, and/or altitude associated with the vehicle and/or the one or more objects in the environment. For example, the vehicle computing system 112 can receive the map data 122 from one or more global positioning satellites.

In some embodiments, the one or more sensors can include one or more light detection and ranging devices (LIDAR), one or more sonar devices, one or more radar devices, and/or one or more cameras. For example, the one or more sensors 114 can include one or more LIDAR devices that can provide point cloud data to the vehicle computing system 112. The point cloud data can include the distance from the one or more sensors 114 to one or more portions of one or more objects in the environment around the vehicle 108. Further, angles between the one or more sensors 114 and the one or more portions of the one or more objects can be determined based at least in part on the location of the one or more sensors 114 and the location at which the LIDAR device beam contacts a portion of the one or more objects.

Furthermore, in some embodiments, the one or more sensors can be positioned on the vehicle to provide one or more sensor outputs and/or data (e.g., sensor data) to provide or create a bird's eye view of the one or more objects. For example, the one or more sensors 114 can be mounted on the roof of the vehicle 108.

In some embodiments, the one or more sensor outputs can be based at least in part on a three-hundred and sixty degree light detection and ranging (LIDAR) sweep by one or more LIDAR devices. For example, the one or more sensors 114 of the vehicle 108 can include a LIDAR device that rotates through three-hundred and sixty degrees in order to capture LIDAR data associated with the environment proximate to the vehicle 108.

At 504, the method 500 can include determining, based at least in part on the sensor data, one or more inflection points corresponding to one or more portions of the one or more objects that occlude detection of the environment beyond the one or more portions of the one or more objects. For example, the vehicle computing system 112 can determine the one or more inflection points corresponding to the one or more portions of a traffic barrier (e.g., the object 230 depicted in FIG. 2) that occludes detection of an area beyond the traffic barrier.

In some embodiments, the one or more inflection points can include one or more three-dimensional points corresponding to a plurality of surfaces of the one or more objects detected by the one or more sensors. For example, the one or more inflection points can include a set of x, y, and z coordinates in which the x, and y coordinates are associated with the length and width of a plane parallel to the surface travelled by the vehicle 108, and the z coordinate is associated with the height above the plane.

At 506, the method 500 can include determining, for each of the one or more inflection points or for some of the one or more inflection points, a set of polar coordinates including a distance from a sensor of the one or more sensors to a portion of the one or more portions of the one or more objects and an angle of the sensor with respect to the portion of the one or more objects. For example, the vehicle computing system 112 can determine a set of polar coordinates for inflection points corresponding to the portions of a traffic barrier (e.g., the traffic barrier described in 504 of the method 500). Furthermore, the set of polar coordinates can include angles in degrees or radians and distances in meters, decimeters, centimeters, millimeters, and/or micrometers.

In some embodiments, the set of polar coordinates can include a plurality of discretized angles ranging from zero degrees to three-hundred and fifty-nine degrees (e.g., a range of three-hundred and sixty degrees). For example, data associated with the set of polar coordinates can include three-hundred and sixty discretized angles that represent a full rotation of a circle.

At 508, the method 500 can include generating, based at least in part on the set of polar coordinates, sparse map data including the set of polar coordinates. For example, the vehicle computing system 112 can generate sparse map data that includes a set of numerical values associated with the set of polar coordinates. By way of further example, the sparse map data can include a location (e.g., longitude, latitude, and altitude) of the one or more sensors 114, the time (e.g., time of day) at which the one or more inflection points were determined, and the set of polar coordinates (e.g., angle and distance) associated with each of the one or more inflection points.

At 510, the method 500 can include generating, by the computing system, based at least in part on the sparse map data, an occlusion map including the one or more portions of the environment that are occluded from the one or more sensors. For example, the vehicle computing system 112 can use the sparse map data to generate an occlusion map that includes a map of the one or more portions of the area travelled by the vehicle 108 that are occluded from detection by the one or more sensors 114.

By way of further example, the vehicle computing system 112 can use the set of polar coordinates of the sparse map data to construct a three-dimensional representation of the environment external to the vehicle 108. The three-dimensional representation of the environment external to the vehicle 108 can include indications of the portions of the environment that are not detected by the one or more sensors 114.

In some embodiments, the occlusion map can include a two-dimensional representation of one or more portions of the environment proximate to the vehicle that are not detected by the one or more sensors. For example, the vehicle computing system 112 can generate a two-dimensional representation of the surface surrounding the vehicle 108 and can include the portions of the surface that are detected by the one or more sensors 114 and indications of the one or more portions of the surface that are occluded from detection by the one or more sensors 114.

At 512, the method 500 can include sending the occlusion map to a perception system of the vehicle, a prediction system of the vehicle, a motion planning system of the vehicle, and/or other system or subsystem of the vehicle. For example, the vehicle computing system 112 can send (e.g., via a wired or wireless connection) one or more signals or data including the occlusion map from one portion of the vehicle computing system 112 to the perception system 124 of the vehicle computing system 112, the prediction system 126 of the vehicle computing system 112, and/or to the motion planning system 128 of the vehicle computing system 112. In some embodiments, the occlusion map can be sent to various other systems or subsystems of the vehicle (e.g., the vehicle 108).

Figure 6:
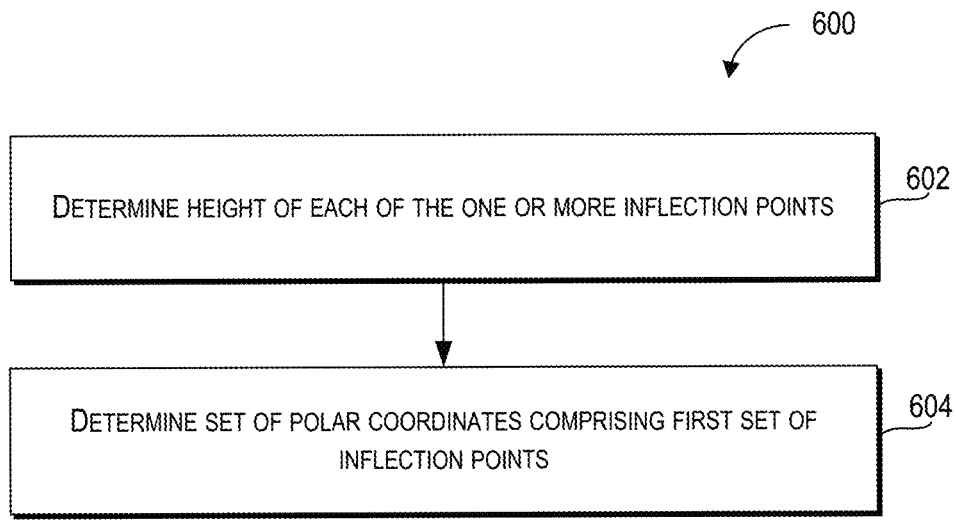
FIG. 6 depicts a flow diagram of an example method of polar occlusion mapping according to example embodiments of the present disclosure.

FIG. 6 depicts a flow diagram of an example method of polar occlusion mapping according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, generate an occlusion map based on sensor data received from one or more sensors of a vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 600 can be performed as part of determining a set of polar coordinates as described in 506 of the method 500.

At 602, the method 600 can include determining a height of each of the one or more inflection points. For example, the vehicle computing system 112 can determine a height (e.g., a height above the surface of the ground) in meters of each of one or more inflection points corresponding to the surfaces of objects (e.g., pedestrians, road surfaces, utility poles, mail boxes, motor vehicles, trees, and/or buildings) detected by the one or more sensors 114 of the vehicle 108.

In some embodiments, determining a height of each of the one or more inflection points can be used in determining, for each of the one or more inflection points (or for some of the one or more inflection points), a set of polar coordinates comprising a distance from a sensor of the one or more sensors to a portion of the one or more portions of the one or more objects and an angle of the sensor with respect to the portion of the one or more objects as described in 506 of the method 500 that is depicted in FIG. 5.

At 604, the method 600 can include determining that the set of polar coordinates is based at least in part on a first set of the one or more inflection points that is closer to the sensor and has a higher height than a second set of the one or more inflection points that has an angle that is at least equal to the first set of the one or more inflection points. For example, the vehicle computing system 112 can determine that the set of polar coordinates is based at least in part on a first set of inflection points associated with a first tree branch that is higher and closer to the front of the vehicle 108 than a second set of inflection points associated with a second tree branch that is lower and further away from the front of the vehicle 108 than the first tree branch.

In some embodiments, determining that the set of polar coordinates is based at least in part on a first set of the one or more inflection points that is closer to the sensor and has a higher height than a second set of the one or more inflection points that has an angle that is at least equal to the first set of the one or more inflection points can be used in determining, for each of the one or more inflection points (or for some of the one or more inflection points), a set of polar coordinates comprising a distance from a sensor of the one or more sensors to a portion of the one or more portions of the one or more objects and an angle of the sensor with respect to the portion of the one or more objects as described in 506 of the method 500 that is depicted in FIG. 5.

Figure 7:
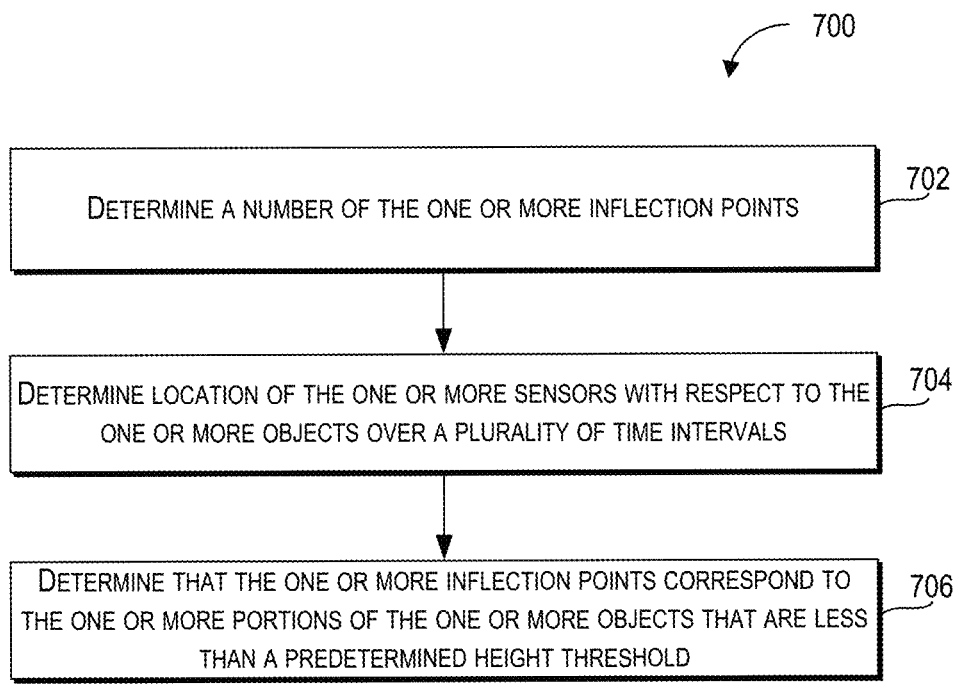
FIG. 7 depicts a flow diagram of an example method of polar occlusion mapping according to example embodiments of the present disclosure.

FIG. 7 depicts a flow diagram of an example method of polar occlusion mapping according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, generate an occlusion map based on sensor data received from one or more sensors of a vehicle. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 700 can be performed as part of generating an occlusion map as described in 504 of the method 500.

At 702, the method 700 can include determining a number of the one or more inflections points based at least in part on sparseness data including a number of the one or more inflection points per unit of area. For example, when the sparseness data indicates one inflection point per cubic decimeter the vehicle computing system 112 can determine that an area of two-thousand cubic decimeters will have two-thousand inflection points. Further, the sparseness data can include values associated with a distribution of the one or more inflection points in the environment. For example, the sparseness data can indicate that the one or more inflection points within one meter of the vehicle are more densely distributed (e.g., one inflection point per cubic decimeter) than the inflection points one hundred meters away from the vehicle (e.g., one inflection point per cubic meter).

In some embodiments, determining a number of the one or more inflections points based at least in part on sparseness data including a number of the one or more inflection points per unit of area can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

At 704, the method 700 can include determining the location of the one or more sensors with respect to the one or more objects over a plurality of time intervals. For example, the vehicle computing system 112 can use a GPS device and a chronometer of the vehicle 108 to determine the latitude, longitude, altitude of the one or more sensors 114 at a plurality of time intervals. By way of further example, the vehicle computing system 112 can determine the location of the vehicle over a ten second time period divided into one hundred tenth of a second time intervals.

In some embodiments, determining the location of the one or more sensors with respect to the one or more objects over a plurality of time intervals can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

At 706, the method 700 can include determining that the one or more inflection points correspond to the one or more portions of the one or more objects that are less than a predetermined height threshold (e.g., a height threshold with respect to a point of reference including the ground proximal to the vehicle 108 or the lowest point of the environment within a predetermined distance of the vehicle 108). For example, the vehicle computing system 112 can determine that the one or more inflection points correspond to one or more portions of a mailbox that is less than a predetermined height threshold of two meters. By way of further example, the vehicle computing system 112 can determine that the one or more inflection points do not correspond to one or more portions of a tree (e.g., a tree branch) that is five meters above ground level. FIG. 4 depicts an example of a predetermined height threshold including the height threshold 404 indicating a minimum height, and the height threshold 406 indicating a maximum height.

In some embodiments, the predetermined height threshold can be based at least in part on a lowest point of the environment with respect to the vehicle or a height of a sensor of the one or more sensors. For example, the vehicle computing system can determine that the predetermined height threshold is based on the distance above the surface of the ground proximal to the vehicle 108.

In some embodiments, determining that the one or more inflection points correspond to the one or more portions of the one or more objects that are less than a predetermined height threshold can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

Figure 8:
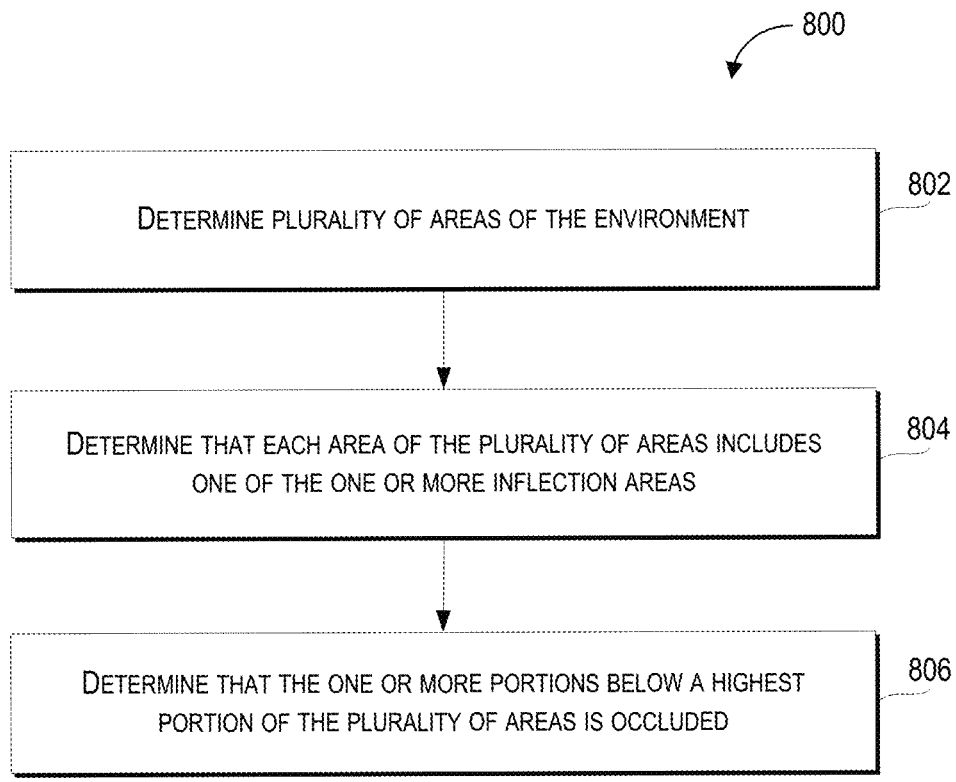
FIG. 8 depicts a flow diagram of an example method of polar occlusion mapping according to example embodiments of the present disclosure.

FIG. 8 depicts a flow diagram of an example method of polar occlusion mapping according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, generate an occlusion map based on sensor data received from one or more sensors of a vehicle. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 800 can be performed as part of determining a set of polar coordinates as described in 504 of the method 500

At 802, the method 800 can include determining a plurality of areas of the environment. Further, each area of the plurality of areas can be a predetermined size (e.g., each area can be one square meter or one cubic meter). For example, the vehicle computing system 112 can determine that an eighty meter by eighty meter area that has the vehicle 108 at its center includes six-thousand four-hundred one meter by one meter areas. By way of further example, the vehicle computing system can determine that a cubic area that is fifty meters per side includes one hundred and twenty-five thousand areas each of which are one cubic meter in size.

In some embodiments, determining a plurality of areas of the environment can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

At 804, the method 800 can include determining that each area of the plurality of areas includes one of the one or more inflection points. For example, the vehicle computing system 112 can determine that each of a plurality of areas (e.g., each of the six-thousand four-hundred areas described in 802 of the method 800) includes one of the one or more inflection points.

In some embodiments, determining that each area of the plurality of areas includes one of the one or more inflection points can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

At 806, the method 800 can include determining that the one or more portions below a highest portion in each of the plurality of areas is occluded. For example, the vehicle computing system 112 can determine that in an area that includes a one meter tall object, a seventy-five centimeter tall object, and a fifty centimeter tall object, the one or more portions of the area below the one meter tall object, including the seventy-five centimeter tall object and the fifty centimeter tall object, are occluded.

In some embodiments, determining that the one or more portions below a highest portion in each of the plurality of areas is occluded can be used in determining, based at least in part on the sensor data, one or more inflection points corresponding to one or more portions of the one or more objects that occlude detection of the environment beyond the one or more portions of the one or more objects as described in 504 of the method 500 that is depicted in FIG. 5.

Figure 9:
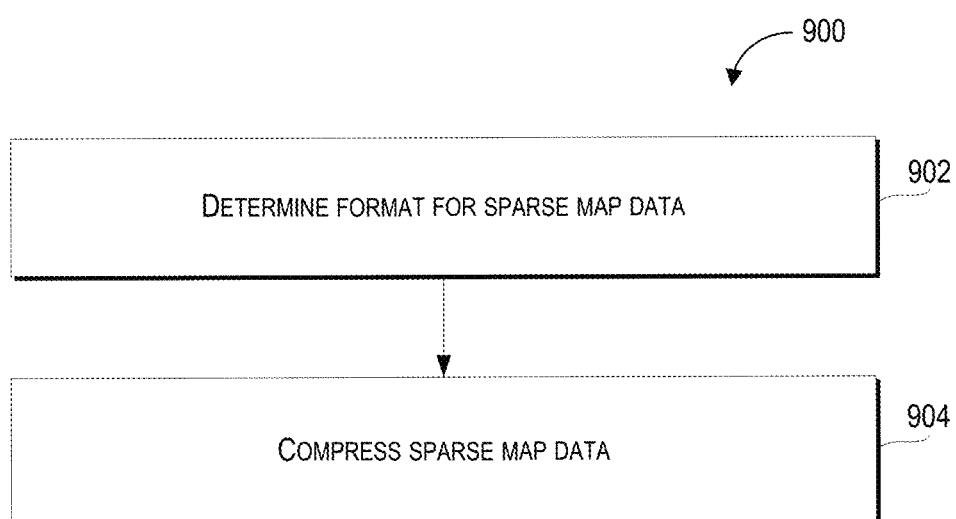
FIG. 9 depicts a flow diagram of an example method of polar occlusion mapping according to example embodiments of the present disclosure.

FIG. 9 depicts a flow diagram of an example method of polar occlusion mapping according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, generate an occlusion map based on sensor data received from one or more sensors of a vehicle. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In example embodiments, one or more portions of the method 900 can be performed as part of generating, based at least in part on the set of polar coordinates, sparse map data comprising the set of polar coordinates as described in 508 of the method 500 that is depicted in FIG. 5.

At 902, the method 900 can include determining a format for sparse map data (e.g., data that includes or is associated with the set of polar coordinates) based at least in part on an amount of available bandwidth (e.g., an amount of bandwidth available to transmit the sparse map data). The format for the sparse map data can be associated with a type of encoding used to construct and/or reconstruct an occlusion map that is based at least in part on the sparse map data. For example, the vehicle computing system 112 determine that available bandwidth for the vehicle computing system 112 to transfer data is half of full bandwidth availability. Based at least in part on the bandwidth availability determination, the vehicle computing system 112 can select a format for the sparse data that will produce more compressed sparse data (e.g., the file size associated with the sparse map data is proportionally smaller in relation to its original size) or less compressed sparse data (e.g., the file size associated with the sparse map data is larger than the file size of the more compressed sparse data).

In some embodiments, determining a format for the sparse map data based at least in part on an amount of available bandwidth in which the format for the sparse map data is associated with a type of encoding used to construct or reconstruct an occlusion map based at least in part on the sparse map data can be used in generating, based at least in part on the set of polar coordinates, sparse map data comprising the set of polar coordinates as described in 508 of the method 500 that is depicted in FIG. 5.

At 904, the method 900 can include compressing the sparse map data using lossless compression. For example, the vehicle computing system 112 can compress the sparse map data using lossless compression to reduce the size of data that is transmitted to the perception system 124 of the vehicle 108, thereby reducing bandwidth utilization while ensuring that the set of polar coordinates is preserved without loss of data.

In some embodiments, compressing the sparse map data using lossless compression can be used in generating, based at least in part on the set of polar coordinates, sparse map data comprising the set of polar coordinates as described in 508 of the method 500 that is depicted in FIG. 5.

Figure 10:
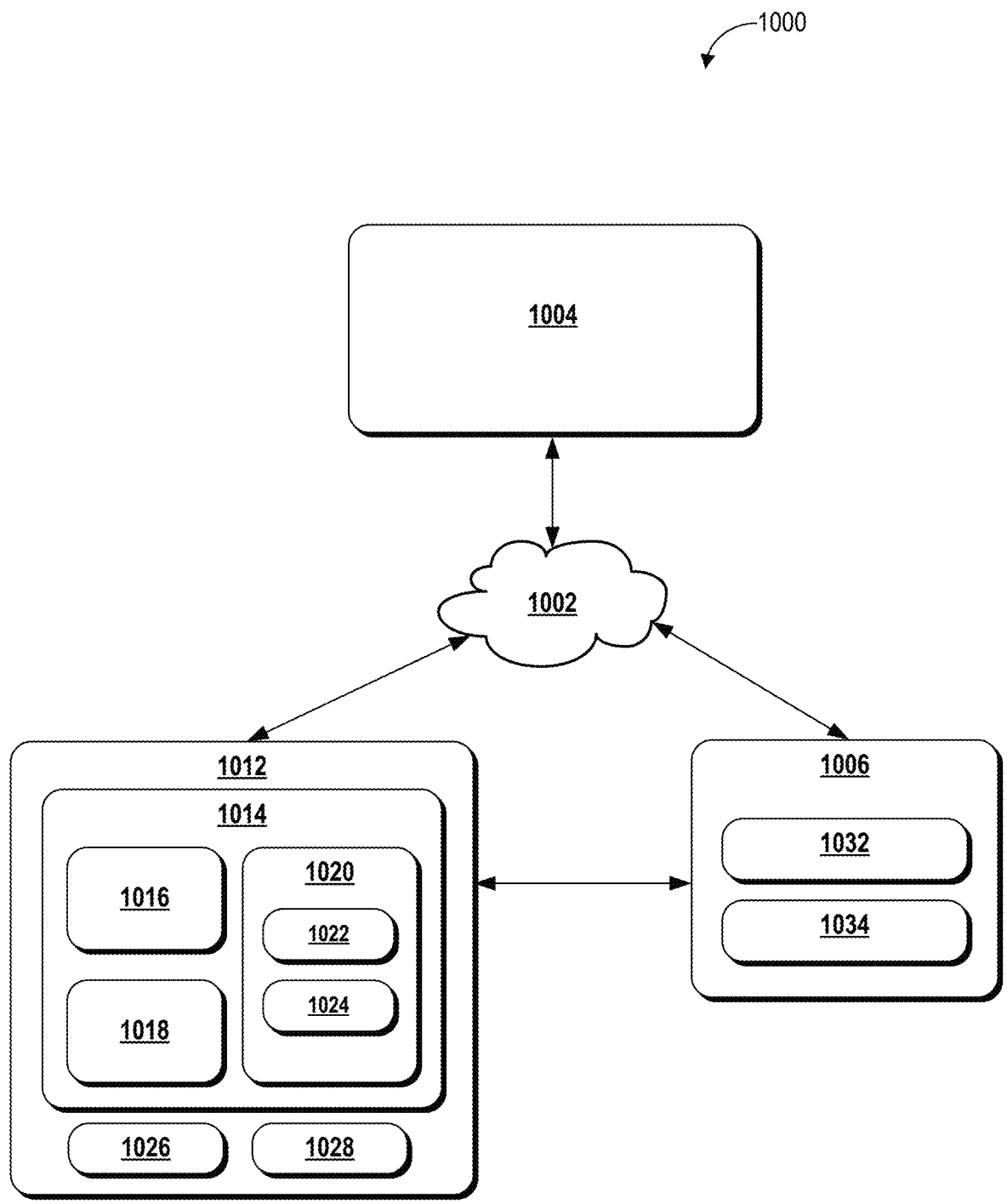
FIG. 10 depicts a diagram of an example system according to example embodiments of the present disclosure.

FIG. 10 depicts a diagram of an example system according to example embodiments of the present disclosure. A system 1000 can include a network 1002 which can include one or more features of the communications network 102 depicted in FIG. 1; an operations computing system 1004 which can include one or more features of the operations computing system 104 depicted in FIG. 1; one or more computing devices 1006 which can include one or more features of the one or more remote computing devices 106 depicted in FIG. 1; a vehicle computing system 1012 which can include one or more features of the vehicle computing system 112 depicted in FIG. 1; one or more computing devices 1014; a communication interface 1016; one or more processors 1018; one or more memory devices 1020; memory system 1022; memory system 1024; one or more input devices 1026; one or more output devices 1028; one or more input devices 1032; and one or more output devices 1034.

The vehicle computing system 1012 can include the one or more computing devices 1014. The one or more computing devices 1014 can include one or more processors 1018 which can be included on-board a vehicle including the vehicle 108 and one or more memory devices 1020 which can be included on-board a vehicle including the vehicle 108. The one or more processors 1018 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1018 can include a single processor or a plurality of processors that are operatively and/or selectively connected. The one or more memory devices 1020 can include one or more non-transitory computer-readable storage media, such as RAM, ROM, EEPROM, EPROM, flash memory devices, magnetic disks, and/or combinations thereof.

The one or more memory devices 1020 can store data or information that can be accessed by the one or more processors 1018. For instance, the one or more memory devices 1020 which can be included on-board a vehicle including the vehicle 108, can include a memory system 1022 that can store computer-readable instructions that can be executed by the one or more processors 1018. The memory system 1022 can include software written in any suitable programming language that can be implemented in hardware (e.g., computing hardware). Further, the memory system 1022 can include instructions that can be executed in logically and/or virtually separate threads on the one or more processors 1018. The memory system 1022 can include any set of instructions that when executed by the one or more processors 1018 cause the one or more processors 1018 to perform operations.

For example, the one or more memory devices 1020 which can be included on-board a vehicle including the vehicle 108 can store instructions, including specialized instructions, that when executed by the one or more processors 1018 on-board the vehicle cause the one or more processors 1018 to perform operations such as any of the operations and functions of the one or more computing devices 1014 or for which the one or more computing devices 1014 are configured, including the operations for receiving sensor data including information based at least in part on one or more sensor outputs associated with detection of one or more objects in an environment by one or more sensors of a vehicle (e.g., the one or more sensors 114 of the vehicle 108); determining, based at least in part on the sensor data, one or more inflection points corresponding to one or more portions of the one or more objects that occlude detection of the environment beyond the one or more portions of the one or more objects; determining, for each of the one or more inflection points, a set of polar coordinates including a distance from a sensor of the one or more sensors to a portion of the one or more portions of the one or more objects and an angle of the sensor with respect to the portion of the one or more objects; and generating, based at least in part on the set of polar coordinates, sparse map data including the set of polar coordinates, and/or any other operations and/or functions for operation of a vehicle, as described in the present disclosure.

The one or more memory devices 1020 can include a memory system 1024 that can store data that can be retrieved, manipulated, created, and/or stored by the one or more computing devices 1014. The data stored in memory system 1024 can include, for instance, sensor data associated with a vehicle including the vehicle 108; inflection point data associated with one or more inflection points determined by the vehicle computing system 1012; sparse map data associate with the a set of polar coordinates; and/or occlusion map data associated with an occlusion map; data associated with user input; data associated with one or more actions and/or control command signals; data associated with users; and/or other data or information. The data in the memory system 1024 can be stored in one or more databases. The one or more databases can be split up so that they are located in multiple locales on-board a vehicle which can include the vehicle 108. In some implementations, the one or more computing devices 1014 can obtain data from one or more memory devices that are remote from a vehicle, which can include the vehicle 108.

The system 1000 can include the network 1002 (e.g., a communications network) which can be used to exchange (send or receive) signals (e.g., electronic signals) or data (e.g., data from a computing device) including signals or data exchanged between computing devices including the operations computing system 1004, the one or more computing devices 1006, and/or the vehicle computing system 1012. The network 1002 can include any combination of various wired (e.g., twisted pair cable) and/or wireless communication mechanisms (e.g., cellular, wireless, satellite, microwave, and radio frequency) and/or any desired network topology (or topologies). For example, the communications network 1002 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1014 can also include the communication interface 1016 used to communicate with one or more other systems which can be included on-board a vehicle including the vehicle 108 (e.g., over the network 1002). The communication interface 1016 can include any suitable components for interfacing with one or more networks, including for example, transmitters, receivers, ports, controllers, antennas, other hardware and/or software.

The vehicle computing system 1012 can also include one or more input devices 1026 and/or one or more output devices 1028. The one or more input devices 1026 and/or the one or more output devices 1028 can be included and/or otherwise associated with a human-machine interface system. The one or more input devices 1026 can include, for example, hardware for receiving information from a user, such as a touch screen, touch pad, mouse, data entry keys, speakers, and/or a microphone suitable for voice recognition. The one or more output devices 1028 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The one or more computing devices 1006 can include various types of computing devices. For example, the one or more computing devices 1006 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more computing devices 1006 can be associated with a user. The one or more computing devices 1006 described herein can also be representative of a user device that can be included in the human machine interface system of a vehicle including the vehicle 108.

The one or more computing devices 1006 can include one or more input devices 1032 and/or one or more output devices 1034. The one or more input devices 1032 can include, for example, hardware for receiving information from a user, such as a touch screen, touch pad, mouse, data entry keys, speakers, and/or a microphone suitable for voice recognition. The one or more output devices 1034 can include hardware for providing content for display. For example, the one or more output devices 1034 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of object detection, the computer-implemented method comprising:
    receiving sensor data descriptive of one or more objects in an environment from one or more sensors of a vehicle;
    determining based at least in part on the sensor data, one or more inflection points corresponding to one or more portions of the one or more objects that occlude detection of the environment beyond the one or more portions of the one or more objects, wherein a number of the one or more inflection points is determined based on sparseness data comprising a number of the one or more inflection points per unit area;
    determining for the one or more inflection points, a set of polar coordinates comprising a distance from a sensor of the one or more sensors to a portion of the one or more portions of the one or more objects and an angle of the sensor with respect to the portion of the one or more objects; and
    generating based at least in part on the set of polar coordinates, sparse map data comprising the set of polar coordinates.

2. The computer-implemented method of claim 1, further comprising:
    generating based at least in part on the sparse map data, an occlusion map comprising the one or more portions of the environment that are occluded from the one or more sensors.

3. The computer-implemented method of claim 2, wherein the occlusion map comprises a two-dimensional representation of one or more portions of the environment that are not detected by the one or more sensors.

4. The computer-implemented method of claim 2, further comprising:
    sending the occlusion map to a perception system of the vehicle, a prediction system of the vehicle, a motion planning system of the vehicle, or another system of the vehicle.

5. The computer-implemented method of claim 1, wherein determining for the one or more inflection points, a set of polar coordinates comprising a distance from a sensor of the one or more sensors to a portion of the one or more portions of the one or more objects and an angle of the sensor with respect to the portion of the one or more objects comprises:
    determining a height of the one or more inflection points; and
    determining that the set of polar coordinates is based at least in part on a first set of the one or more inflection points that is closer to the sensor and has a higher height than a second set of the one or more inflection points that has an angle that is at least equal to the first set of the one or more inflection points.

6. The computer-implemented method of claim 1, wherein determining based at least in part on the sensor data, one or more inflection points corresponding to one or more portions of the one or more objects that occlude detection of the environment beyond the one or more portions of the one or more objects comprises:
    determining that the one or more inflection points correspond to the one or more portions of the one or more objects that are less than a predetermined height threshold.

7. The computer-implemented method of claim 1, wherein determining based at least in part on the sensor data, one or more inflection points corresponding to one or more portions of the one or more objects that occlude detection of the environment beyond the one or more portions of the one or more objects comprises:
    determining a location of the one or more sensors with respect to the one or more objects over a plurality of time intervals.

8. The computer-implemented method of claim 1, wherein the one or more inflection points comprise one or more three-dimensional points corresponding to a plurality of surfaces of the one or more objects detected by the one or more sensors.

9. The computer-implemented method of claim 1, wherein the one or more sensors comprise one or more light detection and ranging devices (LIDAR), one or more sonar devices, one or more radar devices, or one or more cameras.

10. The computer-implemented method of claim 1, wherein the one or more sensors are positioned on the vehicle to provide data to create a bird's eye view of the one or more objects.

11. The computer-implemented method of claim 1, wherein determining based at least in part on the sensor data, one or more inflection points corresponding to one or more portions of the one or more objects that occlude detection of the environment beyond the one or more portions of the one or more objects comprises:
   determining a plurality of areas of the environment, wherein each of the plurality of areas is a predetermined size; and
   determining that the plurality of areas respectively include the one or more inflection points.

12. The computer-implemented method of claim 11, further comprising:
   determining that the one or more portions below a highest portion in the plurality of areas is occluded.

13. A computing device comprising:
   one or more processors;
   a memory comprising one or more computer-readable media, the memory storing computer-readable instructions that when executed by the one or more processors cause the one or more processors to perform operations comprising:
      receiving sensor data descriptive of one or more objects in an environment from one or more sensors of a vehicle;
      determining, based at least in part on the sensor data, one or more inflection points corresponding to one or more portions of the one or more objects that occlude detection of the environment beyond the one or more portions of the one or more objects, wherein a number of the one or more inflection points is determined based on sparseness data comprising a number of the one or more inflection points per unit area;
      determining, for the one or more inflection points, a set of polar coordinates comprising a distance from a sensor of the one or more sensors to a portion of the one or more portions of the one or more objects and an angle of the sensor with respect to the portion of the one or more objects; and
      generating, based at least in part on the set of polar coordinates, sparse map data comprising the set of polar coordinates.

14. The computer-implemented method of claim 6, wherein the predetermined height threshold is based at least in part on a lowest point of the environment with respect to the vehicle or a height of a sensor of the one or more sensors.

15. One or more tangible non-transitory computer-readable media storing computer-readable instructions that when executed by one or more processors cause the one or more processors to perform operations, the operations comprising:
   receiving sensor data descriptive of one or more objects in an environment from one or more sensors of a vehicle;
   determining, based at least in part on the sensor data, one or more inflection points corresponding to one or more portions of the one or more objects that occlude detection of the environment beyond the one or more portions of the one or more objects;
   determining, for the one or more inflection points, a set of polar coordinates comprising a distance from a sensor of the one or more sensors to a portion of the one or more portions of the one or more objects and an angle of the sensor with respect to the portion of the one or more objects, wherein the set of polar coordinates are determined based on:
      determining a height of the one or more inflection points; and
      determining that the set of polar coordinates is based on a first set of the one or more inflection points that is closer to the sensor and has a higher height than a second set of the one or more inflection points that has an angle that is at least equal to the first set of the one or more inflection points; and
   generating, based at least in part on the set of polar coordinates, sparse map data comprising the set of polar coordinates.

16. The one or more tangible non-transitory computer-readable media of claim 15, wherein the sensor data is based at least in part on a three-hundred and sixty degree light detection and ranging (LIDAR) sweep by one or more LIDAR devices.

17. The one or more tangible non-transitory computer-readable media of claim 15, wherein the set of polar coordinates comprises a plurality of discretized angles ranging from zero degrees to three-hundred and fifty-nine degrees.

18. The computing device of claim 13, wherein the set of polar coordinates are determined based on:
   determining a height of the one or more inflection points; and
   determining that the set of polar coordinates is based on a first set of the one or more inflection points that is closer to the sensor and has a higher height than a second set of the one or more inflection points that has an angle that is at least equal to the first set of the one or more inflection points.

19. The computing device of any of claim 13, wherein generating, based at least in part on the set of polar coordinates, sparse map data comprising the set of polar coordinates comprises:
   determining a format for the sparse map data based at least in part on an amount of available bandwidth, wherein the format for the sparse map data is associated with a type of encoding used to construct or reconstruct an occlusion map based at least in part on the sparse map data.

20. The computing device of claim 13, wherein generating, based at least in part on the set of polar coordinates, sparse map data comprising the set of polar coordinates comprises:
   compressing the sparse map data using lossless compression.

* * * * *